United States Patent Office 3,575,725
Patented Apr. 20, 1971

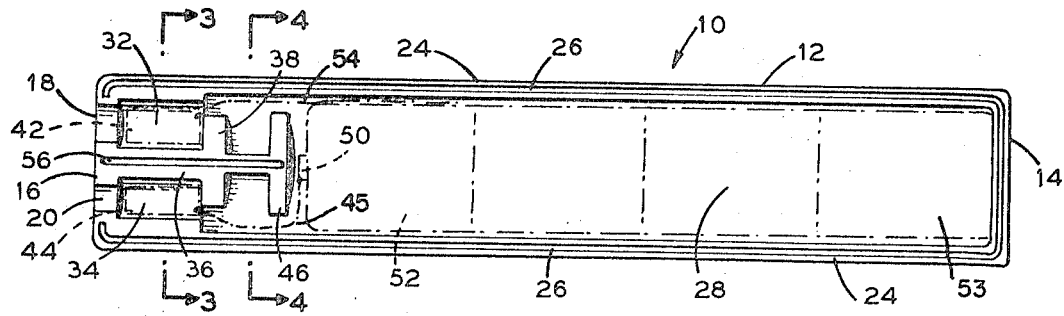

3,575,725
BATTERY ASSEMBLY
Gordon E. Kaye, South Salem, N.Y., assignor to P. R. Mallory & Co., Inc., Indianapolis, Ind.
Filed Mar. 27, 1969, Ser. No. 811,117
Int. Cl. H01m 1/00
U.S. Cl. 136—108                                6 Claims

ABSTRACT OF THE DISCLOSURE

A housing for a multi-cell battery, originally of two pieces, as hollow semi-cylindrical half-housings, with raised rib element or elements on the border edges of one half housing, and a fluted receiving groove on the other half housing, to permit the two half housings to be easily and readily mated to form a closed housing which can then be bonded or sealed at the mutually fitting edges; the major elongated space in the hollow housing provides a chamber for the batteries, and a space in front of the batteries is sub-divided into two small pockets to receive electrode terminals from the string of batteries, and to communicate with co-axially aligned openings in the front end of the housing to receive insertion of external prongs from an external plug, to be connected to the terminals. Two transverse bracing flanges between the front and rear compartments serve to brace the electrode terminals in their pockets against the insertion pressure of external prongs; and to press the string of cells co-axially against the back wall of the housing, so one half-housing may serve as an assembly box for the string of batteries and their terminals during assembly in manufacture.

DESCRIPTION OF THE DISCLOSURE

This invention relates to a battery assembly including a housing for battery cells, which may be arranged in parallel or series strings.

In the interest of economy, it is desirable to provide a method and arrangement of assembling battery cells with a minimum of effort so they will be disposed in their appropriate arrangement for usage in commercial form; and as a further step, in such economical arrangement, it is desirable that the assembling be done in such a way as to utilize a container that is used as a carrier for those cells during assembling for final disposition, so the container will serve as an ultimate final housing for the cells.

A primary object of this invention is to minimize the cost of construction of the battery, by the incorporation of two previously separated parts into a unitarily molded housing, in which the battery cells will be tightly disposed as an assembled package, and in which the two parts of the housing may then be readily bonded and sealed to constitute the final molded housing.

Thus, complicated welding and packaging problems of the prior art are avoided. The battery case, as here disclosed, initially consists of two hollow semi-cylindrical sections to receive a string of cells, and to receive and position a pair of terminals connected to the cells, which terminals are to be disposed at one end of the cylindrical housing, to be available for electrical coupling to an external prong plug. The two semicylindrical sections of the housing are appropriately respectively provided with a male rib or bead on one section, and with a receiving flute or cavity on the other section, the rib and the cavity being so positioned that the two housing sections will be readily engaged for proper closure along the entire length. Such beads or ribs may be patterned to intricate configurations which will assure closely and properly engaging intricate structure surfaces, which may then be readily bonded by suitable agents, or by the application of ultrasonic energy to the seam edges of those structures. Appropriate disposition of the ribs and cavities need not be relied upon as sole means for the actual holding purposes, but they do serve particularly to align the two half-structures in an automated process, which will permit further economy in the assembling and closure of the housing parts by the simple application of the bonding agent or ultrasonic energy.

The manner in which the housing structure of this invention is constructed and the arrangement of the battery cells therein, are explained in more detail in the following specification, and shown in the accompanying drawings, in which:

FIG. 1 is a plan view of one half-section of the housing, looking down into the hollow chamber for receiving the battery cells;

FIG. 2 is a similar plan view of the other half-section of the housing;

FIGS. 3 and 4 are sectional views, taken along the lines 3—3 and 4—4, respectively, of the half-section shown in FIG. 1;

FIGS. 5 and 6 are similar sectional transverse views, taken along the lines 5—5 and 6—6, respectively, in the half-section of FIG. 2; and FIG. 7 is a front elevational view of the final housing, formed by the assembling of the two half-sections of the housing shown in FIGS. 1 and 2, respectively, to show the access openings to the terminals of the battery assembly.

The invention herein, generally, is a unitary housing with a battery assembly consisting of a plurality of cells in series or parallel strings, with provision for achieving access to the cells of the battery through one end of the housing by an appropriate prong-type terminal plug.

One of the features of the invention is that either half-section of the housing may be utilized as a carrier tray or manufacturing fixture for assembling the battery cells in the manufacture of the assembled battery in the housing, and for receiving the terminals connected to the battery for access to an external circuit through an appropriate external plug. After such assembly and disposition of the cells in one half of the housing as such a carrier tray during manufacture assembly, the other half of the housing may then be positioned in proper place to close the housing as a structure, with assurance of proper fit and positioning of the two half-sections of the housing. Such assured proper fit permits automatic handling of the housing when so completely assembled and closed on the battery cells, so that bonding of the two half-sections of the housing by any automatic procedure may be resorted to with assurance that the housing structure is properly assembled.

As shown in FIG. 1, one half-section 10 of the housing consists of a hollow, semi-cylindrical shell 12 having a semi-circular closed rear wall 14 and a semi-circular open wall 16 at the front, which is provided with two semi-circular grooves or half-openings 18 and 20, which will cooperate with similar half-openings in the other half-section to form two circular openings when two proper half-sections are later combined. Those two openings 18 and 20 are provided to permit access of an external prong of a plug connected to an external circuit. The border edge or seam surface 24 on the one half-shell 12 is provided with a concave groove or flute 26 that extends all around the two seam edge surfaces 24 of the half-shell 12, and along a corresponding seam edge surface of the semi-circular rear wall 14.

A semi-cylindrical space within the half-shell 12 is sub-divided into a main compartment 28, and two semi-circular pockets 32 and 34, at the front end of the housing half-shell 12. The main compartment 28 is to receive the battery cells. The two pockets 32 and 34 are respectively co-axially aligned with the two semi-circular openings 18 and 20.

The two pockets 32 and 34 are separated by a wall 36 provided with a transverse flange 38 at the rear of pockets 32 and 34, which substantially blocks a major portion of each of the two pockets 32 and 34 to serve as a bracing wall for the two socket terminals 42 and 44, indicated in those pockets, as terminals of the string of battery cells. Wall 36 extends backward to and supports a second transverse flange 46, which serves as a front buttress or bracing wall for the front central co-axial button electrode 50 on the front battery cell 52. The top surface of that backwardly extending wall 36 is provided with an elongated flute 56.

The general disposition of the two transverse flange pieces 38 and 46 on that wall 36 may be better appreciated upon also looking at sectional FIGS. 3 and 4, respectively.

The socket terminal 44 is connected to front button 50 of cell 52 through a short flat conducting strip 45; and the socket terminal 42 is connected to the outer or wall electrode of rear cell 53, for example, through a long, flat conducting strip 54, wrapped in thin insulation, that fits snugly between the cells and the inner surface of half-shell 12.

In FIG. 2 is shown the second half-shell 12–A, which is similar in all respects to the half-shell 12 shown in FIG. 1, except that the half-shell 12–A in FIG. 2 is provided with upstanding ribs 64 and 66 to fit into the grooves 26 and 56 of the half-shell 12 in FIG. 1. The parts on the shell 12–A of FIG. 2 are otherwise numbered the same as those in FIG. 1, plus the letter A. On the center wall 36–A in FIG. 2, the rib 66 is provided to fit into the slot 56 of the half-shell in FIG. 1.

FIG. 3 shows the disposition of the bracing flange 38 for the terminals 42 and 44 in pockets 32 and 34, to show how the flange blocks part of each pocket to brace those terminals against the insertion force of a prong, 55, on an external plug 57.

FIG. 4 shows the bracing flange 46 which serves as a front buttress for the button electrode 50 on the front battery cell 52.

FIGS. 5 and 6 are similar to FIGS. 3 and 4, except that in FIGS. 3 and 4, being sections of the half-shell 12–A in FIG. 2, ribs 64 and 66 are shown instead of the flutes 26 and 56 of the shell in FIG. 1.

FIG. 7 shows the completed openings 18 and 20 to permit the prongs 55 on the external terminal plug 57 to pass through and enter the battery terminals 42 and 44. The front annular border faces of those terminals 42 and 44 are larger in diameter than the openings 18 and 20, so the terminals will be blocked by the borders of those two openings 18 and 20 when the terminal plug is moved to disconnect the prongs from those terminals.

The casing disclosed herein thus serves as a carrying tray or manufacturing fixture to hold the cells and their terminals and terminal conductors in place and in correct alignment, until the mating half-shell is applied, with proper mating assured by the co-fitting rib and flute arrangement. Suitable bonding procedure may then be employed, by selected bonding material or by ultrasonic bonding between the mated edges.

The housing, when sealed, becomes a unitary structure that holds the cells rigidly in place, in all positions of the housing, and provides proper insulation for the terminals and the cells.

The invention is not limited to the details of construction shown, since they may be varied within the spirit and scope of the invention as defined in the claims.

What is claimed is:

1. A battery assembly comprising a plurality of cells disposed co-axially end-to-end, and each provided with electrode surfaces; means connecting said cells in predetermined circuit string relation, such as series or parallel; an elongated tubular housing with said cells positioned therein, said housing having a main cell chamber for the co-axial cells, with a closed end wall at the rear of said main chamber, and said housing having two separate longitudinally extending auxiliary chambers beyond the front of the main cell chamber, with a separating wall between said auxiliary chambers, and said separating wall having a transverse end flange to serve as a reaction plate at and facing the front end of said main cell chamber to hold assembly cells in place in said main chamber, and said housing having a front end wall with two spaced openings respectively communicating with said auxiliary chambers; and a pair of terminals to be of opposite polarity connected to the appropriate electrode surfaces of said cells, and positioned in said auxiliary chambers, in alignment with said openings in front wall, to receive an external terminal prong plug.

2. A battery assembly as in claim 1, in which each cell has a central axial button electrode, and a casing electrode;
   conducting strip means connecting the button electrodes to sequential casing electrode surfaces within the desired circuit string arrangement; and
   flat conducting strip means connecting one of said two terminals to a button electrode of a cell at one end of said string of cells, and connecting the second of said two terminals to the casing electrode surface of the cell at the other end of said string of cells, with one of said flat conducting strip means extending along the length of said main chamber within a flat insulating cover to fit snugly between cells and the inner surface of the wall of the housing, upon assembling of said cells in said housing.

3. A battery assembly as in claim 1, in which
   said housing consists of two mutually mating half-cylinders, one of which is provided with male rib means and the other of which is provided with fluted groove means to receive said rib means, thereby permitting predetermined fitting assembly of said two half-cylinders around the contained cells, and subsequent bonding of said two half-cylinders along said fitting regions, to form a closed housing, open only at the openings at the front end wall to receive a terminal plug.

4. A battery assembly, as in claim 1, in which
   said housing consists of two semi-cylindrical shells, one shell having raised projection means and the other shell having depressed or cavity means for mutual fitting and coupling of both shells to constitute a closed hollow cylinder having a main chamber for receiving and accommodating a string of battery cells;
   each shell having a closed semi-circular rear wall so the two semi-circular rear walls, when fitted together, will constitute a closed rear end wall;
   each shell also having a semi-circular front end wall to a diameter line with two spaced semi-circular openings at said diameter line, so the two shells, when fitted together, will establish a fitted front wall with two circular openings to receive a two-prong terminal plug;
   each shell also having a longitudinal internal end boss with two spaced semi-circular grooves therein, to receive a terminal, and communicating with said semi-circular openings in the front end wall, and each shell also having a wall backwardly extending axially from said end boss parallel to said semi-circular terminal grooves;
   said backwardly extending wall in each shell having a first transverse flange extending to block a portion at the rear of each of said semi-circular terminal grooves to serve as a bracing wall for a terminal in said groove when an external prong is inserted into said terminal; and a second transverse flange further back on said backwardly extending wall to serve as a front bracing wall against the front end of a string of cells disposed in one of said shells during manufacturing assembly, to hold the cells snugly in place while the co-fitting half-shell is pressed into place and the two half-shells bonded to form a closed housing.

5. A pre-aligned cell battery container comprising a plurality of individual electric cells to give an accumulative voltage output; said container having means therein to align said cells in a manner so as to prevent shorting of the individual cells therein from one another and the external contacts thereof; and said container comprising two mutually mating halves, one of which is provided with at least one projection and the other of which is provided with at least one recess positioned to receive said projection whereby said cells remain unmoveable in said container in a unitary construction.

6. A battery assembly comprising a plurality of cells in a sequence, each cell having a bottom terminal surface and a top terminal surface and each disposed such that the bottom terminal surface of one cell in the sequence is substantially co-planar with the top terminal surface of the next succeeding cell in said sequence; means connecting said cells in predetermined circuit string relation; and elongated housing for said cells, said housing comprising two mutually mating halves, one of which is provided with at least one projection and the other of which is provided with at least one recess positioned to receive said projection thereby permitting predetermined fitting assembly of said two halves around the contained cells to form an unitary device upon sealing.

References Cited
UNITED STATES PATENTS

| | | | |
|---|---|---|---|
| 777,457 | 12/1904 | Wappler et al. | 136—173 |
| 1,457,671 | 6/1923 | Rector | 136—110 |
| 1,568,927 | 1/1926 | Stone et al. | 136—173 |
| 3,194,689 | 7/1965 | Deschamps | 136—173 |

DONALD L. WALTON, Primary Examiner

U.S. Cl. X.R.

136—16, 135